Feb. 2, 1965 T. J. VAN KESSEL 3,168,713
ARRANGEMENTS FOR AVOIDING HIGH-FREQUENCY STRAY OSCILLATIONS IN ACTIVE TWO-TERMINAL ELEMENTS
Filed May 16, 1962
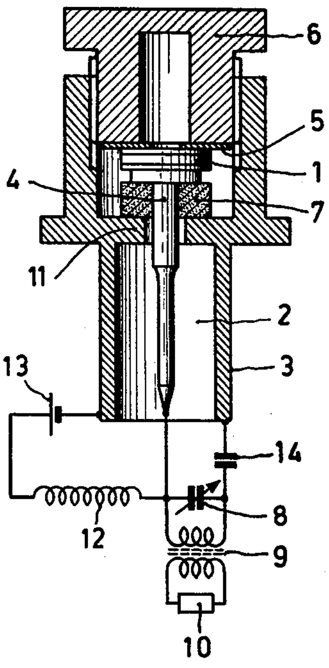
INVENTOR
THEODORUS J. VAN KESSEL
BY [signature]
AGENT United States Patent Office 3,168,713

Patented Feb. 2, 1965

3,168,713

ARRANGEMENTS FOR AVOIDING HIGH-FREQUENCY STRAY OSCILLATIONS IN ACTIVE TWO-TERMINAL ELEMENTS

Theodorus Jozef van Kessel, Emmasingel, Eindhoven, Netherlands, assignor to North American Philips Company, Inc., New York, N.Y., a corporation of Delaware Filed May 16, 1962, Ser. No. 195,201
Claims priority, application Netherlands, July 7, 1961, 266,797
7 Claims. (Cl. 331—105)

This invention relates to an arrangement for counteracting high frequency stray oscillations in active two-terminal elements or networks whose operating point lies on the part of the static current-voltage characteristic curve having a negative slope; an example of such a two-terminal element is a tunnel diode.

Such high-frequency stray oscillations readily occur when a tunnel diode or other active two-terminal element is coupled to other active elements, for example, transistors. Inductances are readily introduced in the leads to the other active elements and these may give rise to the undesirable oscillations. These inductances can be kept to a minimum only with great difficulty.

As is known, the oscillation condition for a tunnel diode is as follows: $L>R|R-|C$. In this expression L designates the total series inductance of the diode and of the connected circuit, R the internal loss resistance of the diode and the resistance of the connected circuit in series, $|R-|$ the absolute value of the negative resistance of the tunnel diode at the operating point and C the capacitance of the tunnel diode.

One manner of avoiding the low-frequency stray oscillations is to include a smoothing capacitor of sufficiently high value in the supply circuit; as a result of this the quantity C in the expression of the oscillation condition is increased.

The invention has for its object to provide an effective means for counteracting the high-frequency stray oscillations without affecting the capacitance of the element. According to the invention, the active two-terminal element is directly coupled to a ring of a non-conductive ferromagnetic material, for example the material known by the name "Ferroxcube," the main constituent of which is ferrite. Preferably, a material is chosen whose critical frequency lies below the frequency at which the high-frequency stray oscillations may occur. One of the underlying features of the invention is the utilization of the fact that the absorption of high-frequency energy by materials of this kind is highly dependent upon the frequency.

As a result of the introduction of a ring of "Ferroxcube," the inductance L is increased and it appears at first sight that the oscillation condition for waves in the centimeter and decimeter range is even more readily satisfied; however, the absorption in such a ring in the frequency range of the stray oscillations increases to such an extent that the oscillation condition nevertheless remains unsatisfied. In other words, owing to the introduction of a ring of "Ferroxcube" in accordance with the invention, R increases to a greater extent than L for the undesirable oscillations. Although for waves in the meter range the ferrite introduces a certain damping which in some cases may be appreciable, the oscillation condition may readily be satisfied, if desired, since it has been found that R is increased but the inductance L also increases considerably to an extent greatly exceeding that in the centimeter and decimeter ranges.

The tunnel diode and the ring may be united to form an integral structure by placing the ring in close proximity to the tunnel diode so as to surround the supply lead to one of the electrodes of the tunnel diode.

The invention will now be described more fully with reference to the drawing wherein one embodiment is shown in the single accompanying figure.

As shown in the figure, the tunnel diode 1 terminates a short coaxial cable 2; it is arranged between an inner conductor 4 and a sleeve 6 which is screwed into an outer conductor 3 of the coaxial cable. The sleeve 6 bears against a resilient ring 5 on one electrode of the tunnel diode 1, while the other electrode rests on a thickened part of the inner conductor 4. The inner conductor is surrounded by a ring 7 of an electrically non-conductive ferromagnetic material which engages the tunnel diode 1 and is clamped between the tunnel diode 1 and a local annular constriction 11 in the outer conductor 3.

An example of a suitable ferromagnetic material is a ferrite which is known by the name of "Ferroxcube IV E." The critical frequency of "Ferroxcube IV E" is approximately 60 mc./s. (the term "critical frequency" is to be understood herein to mean the frequency at which $\tan \delta=1.1$ where $\delta$ represents the loss angle. The resistance of this material to high-frequency currents in the coaxial cable increases with the frequency, but at frequencies of approximately 100 mc./s. it is still comparatively low, while the inductance introduced is so high that for these frequencies an amplifier or an oscillator can be built. Damping of higher frequencies however is so great that despite the increase of L the oscillation condition at these higher frequencies cannot be satisfied.

In the embodiment shown the tunnel diode 1 is arranged as an oscillator. By means of a variable capacitor 8 the frequency may be adjusted between 80 and 110 mc./s. The high-frequency energy is derived from the high-frequency circuit through the transformer 9 and supplied to a load 10. The operating point of the tunnel diode 1 is adjusted by means of a supply source 13. A choke coil 12 is used to decouple the supply source 13 from the high-frequency circuit; a separating capacitor 14 has a negligible impedance for the signal frequencies. In this circuit, removal of the ring 7 gives rise to stray oscillations having a frequency of a few hundred megacycles.

It is thus seen that the invention provides a satisfactory and effective means for avoiding high-frequency stray oscillations in active two-terminal elements. While the invention has been described with respect to a specific embodiment, various other modifications and variations will readily occur to those skilled in the art without departing from the inventive concept, the scope of which is set forth in the appended claims. It is also to be understood that all quantitative values given are illustrative only and are given only to enable ready practice of the invention.

What is claimed is:

1. An arrangement for avoiding undesired high-frequency stray oscillations comprising: an active two-terminal element with two electrodes, said element having a static current-voltage characteristic curve a portion of which exhibits a negative resistance and an operating point lying on the negative-resistance portion, a resonant circuit electrically connected across said element, a source of voltage supply having one terminal coupled to one of said electrodes and another terminal coupled to the other of said electrodes for establishing operation in said negative-resistance portion, and a ring of non-conductive ferromagnetic material having ferrite as a major constitutent, said ring being in close physical proximity to at least one electrode of said element.

2. An arrangement as claimed in claim 1, wherein said material has a critical frequency lying below the frequency of the undesired stray oscillations.

3. An arrangement for avoiding undesired high-frequency stray oscillations comprising: a tunnel diode comprising two electrodes and having a static current-voltage characteristic curve a portion of which exhibits a negative resistance and an operating point lying on the negative-resistance portion, a resonant circuit electrically connected across said tunnel diode, a source of voltage supply having one terminal coupled to one of said electrodes and another terminal coupled to the other of said electrodes for establishing operation in said negative-resistance portion, and a ring of non-conductive ferromagnetic material having ferrite as a major constituent, said ring being in close physical proximity to at least one electrode of said diode, said material having a critical frequency lying below the frequency of the undesired stray oscillations.

4. An arrangement for avoiding undesired high-frequency stray oscillations comprising: a tunnel diode comprising two electrodes and having a static current-voltage characteristic curve a portion of which exhibits a negative-resistance and an operating point lying on the negative-resistance portion, a co-axial cable having outer and inner conductors, a resonant circuit electrically coupled across said tunnel diode through said co-axial cable, a source of voltage supply having one terminal coupled to one of said electrodes through said outer conductor and another terminal coupled to the other of said electrodes through said inner conductor for establishing operation in said negative-resistance portion, and a ring of non-conductive ferromagnetic material having ferrite as a major constituent, said diode being located within the outer conductor of said co-axial cable, the inner conductor of the co-axial cable abutting one of the electrodes of the tunnel diode and forming a supply lead therefor, said ring being placed in close physical proximity to said one electrode and surrounding said supply lead to form an integral structure with said tunnel diode.

5. An arrangement as claimed in claim 4, wherein said material has a critical frequency lying below the frequency of the undesired stray oscillations.

6. An arrangement for avoiding undesired high-frequency stray oscillations comprising: a tunnel diode comprising two electrodes and having a static current-voltage characteristic curve a portion of which exhibits a negative resistance and an operating point lying on the negative-resistance portion, a source of voltage supply having one terminal coupled to one of said electrodes and another terminal coupled to the other of said electrodes for establishing operation in said negative-resistance portion, and a ring of non-conductive ferromagnetic material having ferrite as a major constituent, said ring being in close physical proximity to at least one electrode of said tunnel diode.

7. An arrangement for avoiding undesired high-frequency stray oscillations comprising: a tunnel diode comprising two electrodes and having a static current-voltage characteristic curve a portion of which exhibits a negative resistance and an operating point lying on the negative-resistance portion, a co-axial cable having outer and inner conductors, a source of voltage supply having one terminal coupled to one of said electrodes through said outer conductor and another terminal coupled to the other of said electrodes through said inner conductor for establishing operation in said negative-resistance portion, and a ring of non-conductive ferromagnetic material having ferrite as a major constituent, said diode being located within the outer conductor of said co-axial cable, the inner conductor of the co-axial cable abutting one of the electrodes of the tunnel diode and forming a supply lead therefor, said ring being placed in close physical proximity to said one electrode and surrounding said supply lead to form an integral structure with said tunnel diode.

No references cited.